Sept. 16, 1958  B. F. R. CRETIN-MAITENAZ  2,851,925
MOUNTING OF LENSES IN SPECTACLE FRAMES
Filed Nov. 16, 1954  2 Sheets-Sheet 1

Sept. 16, 1958  B. F. R. CRETIN-MAITENAZ  2,851,925
MOUNTING OF LENSES IN SPECTACLE FRAMES
Filed Nov. 16, 1954  2 Sheets-Sheet 2

United States Patent Office 2,851,925
Patented Sept. 16, 1958

2,851,925

MOUNTING OF LENSES IN SPECTACLE FRAMES

Bernard Fernand Robert Cretin-Maitenaz, Joinville-le-Pont, France, assignor to Societe Industrielle & Commerciale des Ouvriers Lunetiers (Cottet, Poichet, Tagnon & Cie), Paris, France Application November 16, 1954, Serial No. 469,263

Claims priority, application France November 16, 1953

4 Claims. (Cl. 88—47)

The invention relates to improvements in the fixation of lenses in spectacle frames of the type comprising a metal front bar, by means of two upper bearing zones against which each lens is urged by the resiliency of a clamping rim encircling the lower portion of the lens.

For this purpose, abutment-forming grooved members are secured to the front bar on either side of the bridge piece and to the temple ends, a rim encircling each lens so as to exert a clamping action thereon and being secured in these abutment members; each lens is shaped to receive the clamping rim and the abutment-engaging portion is cut for this purpose and also for receiving the end portions of the rims; in addition, these end portions are locked in position within these abutment members.

According to a preferred form of embodiment of this invention, each lens-encircling rim is a thin-sectioned resilient member encircling the lens with its lower portion.

According to an advantageous form of embodiment of the invention, the lens is formed at its lower portion with a groove and at its upper portion with a bevelled edge.

According to a further alternative designed to simplify the mounting of the spectacles the pair of upper abutment members are interconnected to form a single, integral member and the edges of the lens rims are either grooved or bevelled throughout, according as the fixation of both the rims and the upper abutment members is of the female or male type.

The abutment is grooved and has fitted in its groove a resilient element having a projecting longitudinal portion adapted to fit either in the lens groove or on the lens bevel, except at those locations where the lens-supporting rim is fixed.

The accompanying drawings forming part of this specification illustrate diagrammatically by way of example a few forms of embodiment of the invention which are given solely by way of example. In the drawings.

Figure 2:
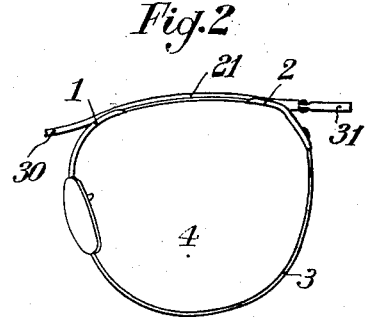
Figure 2 is a rear view thereof.

As clearly illustrated in Fig. 2, the lens is urged for engagement with the pair of abutment-forming grooved members 1, 2 secured on either side of a bridge piece 30 and to the temple ends 31 of the front bar 21, by a relatively thin rim 3 encircling and clamping the lens.

Figure 3:
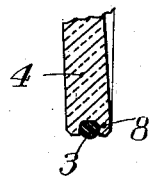
Figures 3 and 4 are detail sections showing two alternate methods of fitting the lower rims around the corresponding lenes.

Fig. 3 illustrates the detail of a male rim 3 engaging the lens 4 by fitting in a groove 8 formed along the peripheral edge of the lens.

Figure 4:
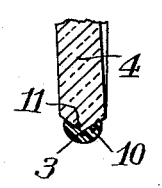

Fig. 4 shows the same mounting except that the rim 3 is a female member receiving the bevelled edge 11 of the lens 4.

Figure 1:
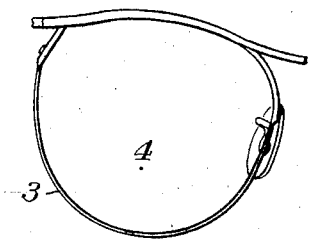
Figure 1 shows in front view a spectacle mounting made in accordance with the teachings of this invention.
Figure 5:
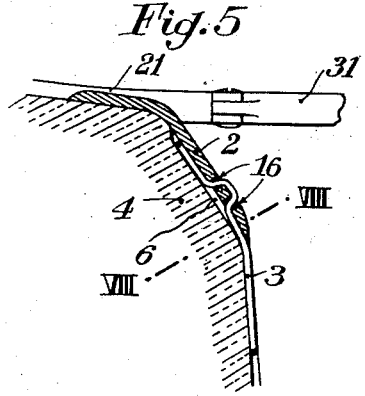
Figure 5 is a diagrammatical, part-sectional view showing one manner of securing the lens laterally.
Figure 6:
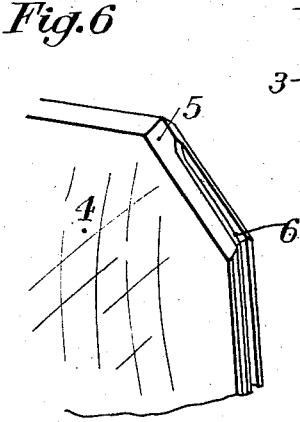
Figure 6 shows the appearance of one lens of the spectacles in the lateral region thereof.
Figure 8:
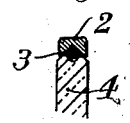
Figure 8 is a detail section taken upon the line VIII—VIII of Fig. 5.

The preferred method of securing the lens-retaining rim 3 on the lateral abutment 2 is illustrated in Figs. 5 and 6, Fig. 6 showing more particularly the shape of the lens 4 in the corresponding region. In this figure it is apparent that the lens is formed with a bevelled edge 5 in the regions designed to engage the abutments 1 and 2 of Fig. 1, these abutments being shaped correspondingly, that is to say, with a female groove if the lens edge has a male bevel, and vice-versa.

In the example shown in Fig. 3 of the drawings, i. e. wherein the thin rim 3 is a simple wire engaging a groove formed in the lens 4, the latter is formed, as shown in Fig. 6, with a groove terminating, as shown in Fig. 5, along the bevelled edge portion engaging about one-half of the abutment member 2, in the longitudinal direction thereof.

The rim-forming wire 3 is passed through a pair of locking holes 16 formed in the abutment member 2, and the upper end of the wire 3 is bent so as to be clamped and held against movement between the lens 4 and the abutment member 2.

Figure 7:
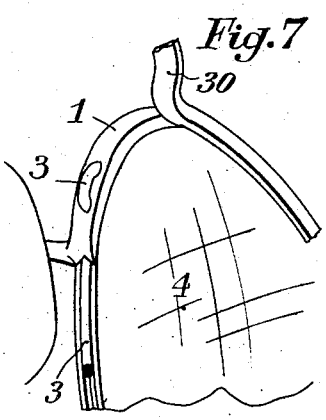
Figure 7 illustrates diagrammatically the appearance of the spectacles in the nose region thereof.

The mounting of the nose side of the lens is symmetrical to that described hereinabove, as will be seen from Fig. 7 of the drawings.

It will be readily apparent that if the lens rim, irrespective of its section, whether male or female, has a sufficient resiliency, the lens mounting will be very simple; to this end it will be sufficient to position the lens on the rim, to tension the latter so as to present the lens in proper alignment with the abutment members and finally to release the rim; thus, a perfect mounting will be obtained.

A non-resilient rim may also be employed; in this case, the rim will be fitted by successively and progressively pulling the upper portion 3 thereof (Fig. 5) and the end projecting from the abutment member 2.

Figure 9:
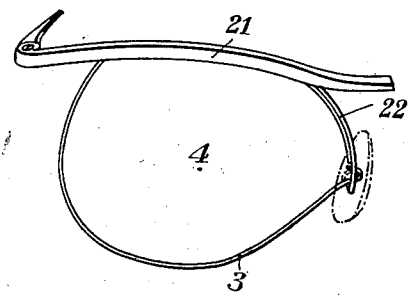
Figure 9 is a front view showing one portion of a spectacle frame without the relevant lens.
Figure 10:
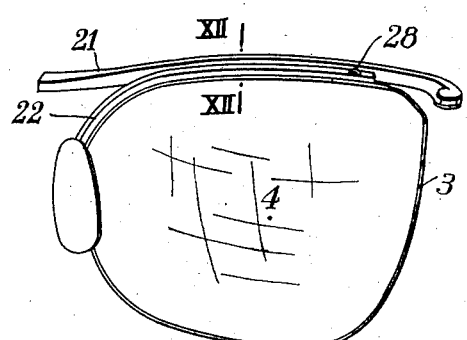
Figure 10 is a rear view of one portion of spectacles made in accordance with the teachings of this invention.

Figs. 9 and 10 illustrate the front bar 21 of the spectacle frame, the abutment member 22 secured through its side 34 behind the bar 21, the lens 4 and the lower fixation member 3.

Figure 11:
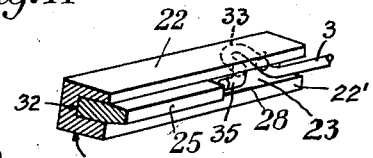
Figure 11 shows a detail of the spectacle frame of Fig. 9, as seen in isometric and part-sectional view.

Fig. 11 shows the shape of the abutment member 22 wherein a groove 23 receives along one portion of its length an element 25 made preferably of a strip of an inherently yielding or resilient material.

Figure 12:
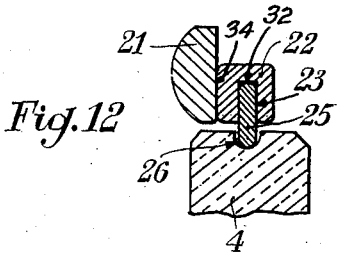
Figures 12 and 13 are enlarged detail sections taken upon the line XII—XII of Fig. 9, Fig. 12 showing the mounting of a lens with a male element and Fig. 13 the same mounting but with a female element.

As shown in Figs. 10 and 12 the element 25 is received in a groove 26 in the edge of the lens 4 and the lens is urged against the element 25 by the resilient wire 3. The element 25 stops short of the end of the abutment member 22, leaving an end portion 22' in which holes 28 extend through the bottom of the groove abutment member. The end of the wire 3 is secured to the abutment member by entering the groove 23, looping out through one hole 28 and back through the other hole and having an end portion lying in the groove and bent toward the strip 25.

Figure 13:
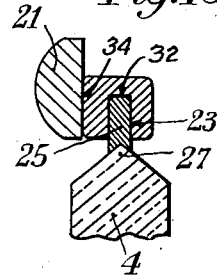

Figure 13 illustrates the same mounting in the case of a lens formed with a bevelled edge 27 instead of a grooved edge.

Of course, the invention described herein as being applied to a metal spectacle frame is also applicable to plastic frames wherein the projecting element 25 corresponding to the element fitted in the abutment member 22 may be formed directly either in the front bar 21 or in the abutment member proper.

What I claim is:

1. A device for securing optical lenses to a spectacle frame having a metal front bar, which comprises a grooved rail secured behind each side portion of said front bar, a strip of yielding resilient material inserted in the major portion of the groove formed in said rail and engaging the upper edge of the relevant lens throughout the length of said strip, a pair of closely spaced holes formed through the bottom of the groove and adjacent to the temple end of each rail, a resilient flexible wire encircling side and lower edges of the lens and having its ends secured to the frame, an end portion of said wire entering the temple end of said groove, extending out through the first of said holes and back into said groove through the second of said holes with a terminal portion extending along said groove and clamped therein between the lens and the bottom of the groove, said wire holding the lens resiliently against said resilient strip.

2. In combination with a spectacle lens having a groove around its periphery, a spectacle frame comprising a front bar, a grooved rail secured behind each side portion of said front bar, a strip of yielding resilient material inserted in the groove of said rail and extending to within a short distance from each end thereof, said strip engaging in the groove on the upper edge of the lens throughout the length of said strip, said rail having a pair of closely spaced holes formed through the bottom of the groove and adjacent to the temple end of said rail, a resilient flexible wire extending around the side and bottom edges of said lens and engaging the lens groove and having its ends secured to the ends of said rail, an end portion of said wire entering the temple end of said rail groove, extending out through the first of said holes and back into the rail groove through the second of said holes and having a terminal portion extending along said rail groove and clamped therein between the bottom of said groove and the lens, said wire holding the lens resiliently against said resilient strip.

3. In combination with a spectacle lens having a bevelled edge, a spectacle frame comprising a front bar, a grooved rail secured behind each side portion of said front bar, a strip of yielding resilient material inserted in the groove of said rail and extending to within a short distance from each end thereof, said strip having a channel engaging the upper bevelled edge of the relevant lens throughout the length of said strip, said rail having a pair of closely spaced holes formed through the bottom of said groove and adjacent the temple end of said rail, a resilient wire of channel cross section extending around the side and botom edges of said lens and engaging the bevelled edge of said lens, said wire having its ends secured respectively to opposite ends of said rail, an end portion of said wire entering the temple end of said groove extending out through the first of said holes and back into said groove through the second of said holes and having a terminal portion extending along said groove and held therein between the bottom of said groove and the lens, said wire holding the lens resiliently against said resilient strip.

4. A device for securing an optical lens to a spectacle frame comprising a front bar, a grooved rail secured behind each side portion of said front bar, a strip of yielding resilient material in said groove throughout the length thereof except a short portion at either end, said rail having a pair of closely spaced holes formed through the bottom of said groove and adjacent the temple end of the rail, a lens positioned with its upper edge engaging said strip and a flexible wire encircling the side and bottom edges of said lens and holding it securely against said strip, said wire having its ends secured to the frame, an end portion of said wire entering the temple end of said groove, extending out through the first of said holes and back into said groove through the second of said holes and having a terminal portion extending along said groove substantially to the adjacent end of said strip.

References Cited in the file of this patent

UNITED STATES PATENTS

| | | |
|---|---|---|
| 1,055,904 | Hansen | Mar. 11, 1913 |
| 1,317,131 | Herrick | Sept. 23, 1919 |
| 1,358,200 | Hansen | Nov. 9, 1920 |
| 1,392,832 | Johnson | Oct. 4, 1921 |
| 1,520,979 | Stevens | Dec. 30, 1924 |
| 2,516,549 | Chappell | July 25, 1950 |
| 2,554,386 | Rohrbach | May 22, 1951 |

FOREIGN PATENTS

| | | |
|---|---|---|
| 794,129 | France | Dec. 2, 1935 |
| 1,065,995 | France | Jan. 13, 1954 |
| 422,927 | Italy | June 27, 1947 |
| 689,997 | Great Britain | Apr. 18, 1953 |